United States Patent [19]

Lutze et al.

[11] 4,186,957
[45] Feb. 5, 1980

[54] FORWARD LONGITUDINAL BEARER SUPPORTED AT FORWARD END WALL OF SELF-SUPPORTING MOTOR VEHICLE BODY

[75] Inventors: Hans Lutze, Aidlingen; Dieter Weidemann, Weil der Stadt; Helmut Weisshappel, Sindelfingen, all of Fed. Rep. of Germany

[73] Assignee: Daimler-Benz Aktiengesellschaft, Fed. Rep. of Germany

[21] Appl. No.: 911,926

[22] Filed: Jun. 2, 1978

[30] Foreign Application Priority Data

Jun. 3, 1977 [DE] Fed. Rep. of Germany ....... 2725084

[51] Int. Cl.² .............................................. B62D 21/00
[52] U.S. Cl. .................................... 296/188; 280/781
[58] Field of Search ................. 296/28 R, 28 E, 28 F, 296/28 J, 28 K; 280/781, 785; 180/89.1, 90

[56] References Cited

U.S. PATENT DOCUMENTS

| 2,047,336 | 7/1936 | Stout | 296/28 J |
| 2,797,954 | 7/1957 | Uhlenhaut | 296/28 J |
| 3,827,525 | 8/1974 | Felzer | 296/28 R |
| 3,971,588 | 7/1976 | Bauer | 296/28 R |

Primary Examiner—Philip Goodman
Attorney, Agent, or Firm—Craig and Antonelli

[57] ABSTRACT

A longitudinal bearer support for a forward longitudinal bearer supported under angular bending at the end wall of a self-supporting motor vehicle body, in which the end wall is locally bulged-out in the direction of the vehicle end within the connecting area of each forward longitudinal bearer to provide a form-rigid body; each forward longitudinal bearer receives a forking in its approach at the form-rigid body, providing four arms of which the two lower arms extend to the subfloor while the two upper arms terminate within the area of the form-rigid body.

12 Claims, 3 Drawing Figures

FORWARD LONGITUDINAL BEARER SUPPORTED AT FORWARD END WALL OF SELF-SUPPORTING MOTOR VEHICLE BODY

The present invention relates to a forward longitudinal bearer supported under angular bending at the end wall or dashboard of a self-supporting motor vehicle body, whereby within the connecting area of each forward longitudinal bearer, the end wall is locally bulged-out in the direction toward the vehicle end in such a manner that a form-rigid body results, and whereby each forward longitudinal bearer in its approach at the form-rigid body receives a forking and the arms resulting thereby at least partially surround the form-rigid body, according to German Application No. P 27 25 083.5 (which corresponds to commonly assigned U.S. application Ser. No. 911,923, filed June 2, 1978).

Large forces can be introduced over a large area by way of the individual arms into an end wall area reinforced in such a manner without prematurely leading to rearward shifts and displacements within the area of the end wall and of the pedal floor already in case of smaller overall deformations. A reinforcement of the forward longitudinal bearer within the area of the steering fastening is also simultaneously achieved therewith.

It is the aim of the present invention to indicate a solution in an advantageous further development of the described connecting area of the forward longitudinal bearer at the end wall, which with a relatively simple construction, fully satisfies all requirements.

Consequently, a longitudinal bearer support of the type described hereinabove is proposed, whereby according to the present invention four arms are created by the forking, of which the two lower arms—subtending an acute angle—lead to the subfloor and whereby the two upper arms terminate within the area of the form-rigid body.

The same goal is also achieved in that the arms form partial surfaces of a cap preferably mounted on the form-rigid body in the manner of a sandwich-type construction, whereby the forward longitudinal bearer abuts at this cap.

A further increase of the rigidity can be achieved in that each form-rigid body extending laterally to the forward wall column is connected with the transmission tunnel by way of a formed-on support surface and the support surfaces are connected with each other.

It is of advantage if the upper surface of the form-rigid body extends approximately parallel to the steering spindle and the fastening of the steering column takes place along the inside of this upper surface. With a simple steering spindle guidance, the size of the leg space is only slightly reduced thereby.

In one preferred embodiment of the present invention, the arms receive a closed bearer profile within the area of the form-rigid body by the walls thereof.

Accordingly, it is an object of the present invention to provide a longitudinal bearer support for the forward longitudinal bearer supported under angular bending at the end wall of a self-supporting motor vehicle body which avoids by simple means the aforementioned shortcomings and drawbacks encountered in the prior art.

Another object of the present invention resides in a longitudinal bearer support for the forward longitudinal bearers supported at the end wall of a self-supporting motor vehicle body, which effectively prevents rearward displacements and shifts within the area of the end wall and of the pedal floor already in case of smaller overall deformations.

A further object of the present invention resides in a forward longitudinal bearer support of the type described above which fully satisfies all requirements and demands made thereof by extremely simple structural means.

Still another object of the present invention resides in a longitudinal bearer support for a forward longitudinal bearer supported under angular bending at the end wall of a self-supporting motor vehicle body which not only offers increased rigidity by simple structural means but also a simple steering spindle guidance without significant reduction in the leg room of the vehicle.

These and other objects, features and advantages of the present invention will become more apparent from the following description when taken in connection with the accompanying drawing which shows, for purposes of illustration only, one embodiment in accordance with the present invention, and wherein.

Figure 1:
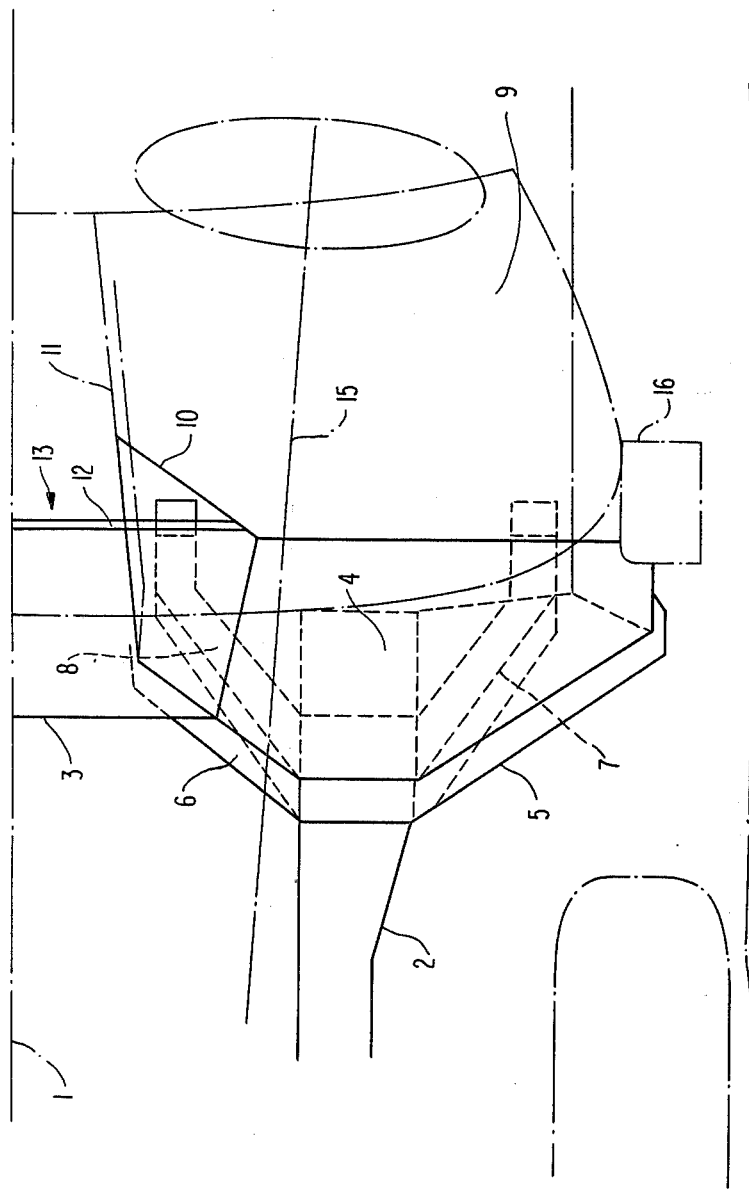
FIG. 1 is a somewhat schematic partial plan view on a connecting area of a forward longitudinal bearer constructed in accordance with the present invention.

Referring now to the drawing wherein like reference numerals are used throughout the various views to designate like parts, a passenger motor vehicle partly indicated in dash and dotted lines includes on both sides of its center longitudinal axis 1 a forward longitudinal bearer 2 which is supported under angular bending at the dashboard or end wall 3. The end wall 3 is bulged-out within this area in the shape of a truncated pyramid and forms thereby a form-rigid body 4 which is surrounded by four arms 5, 6, 7 and 8 which form the extension of the longitudinal bearer 2 and consist of one or several parts. As a result thereof, the bearing strength of the end wall zone supported at the forward wall column 16 is decisively improved.

Whereas the upwardly disposed arms 5 and 6 terminate within the area of the form-rigid body 4, the two lower arms 7 and 8 extend beyond the form-rigid body 4 and adjoin the subfloor 9 to which they are suitably connected. Each form-rigid body 4 includes in the direction toward the center longitudinal axis 1, a formed-on support surface 10 which adjoins the transmission tunnel 11, to which it is connected in any suitable manner. The support surfaces 10 are additionally connected with each other by a strut or brace 12 for purposes of increasing the cross rigidity. The thus subdivided space generally designated by reference numeral 13 (FIG. 1) serves for the accommodation of aggregates such as, for example, the heating installation.

Figure 2:
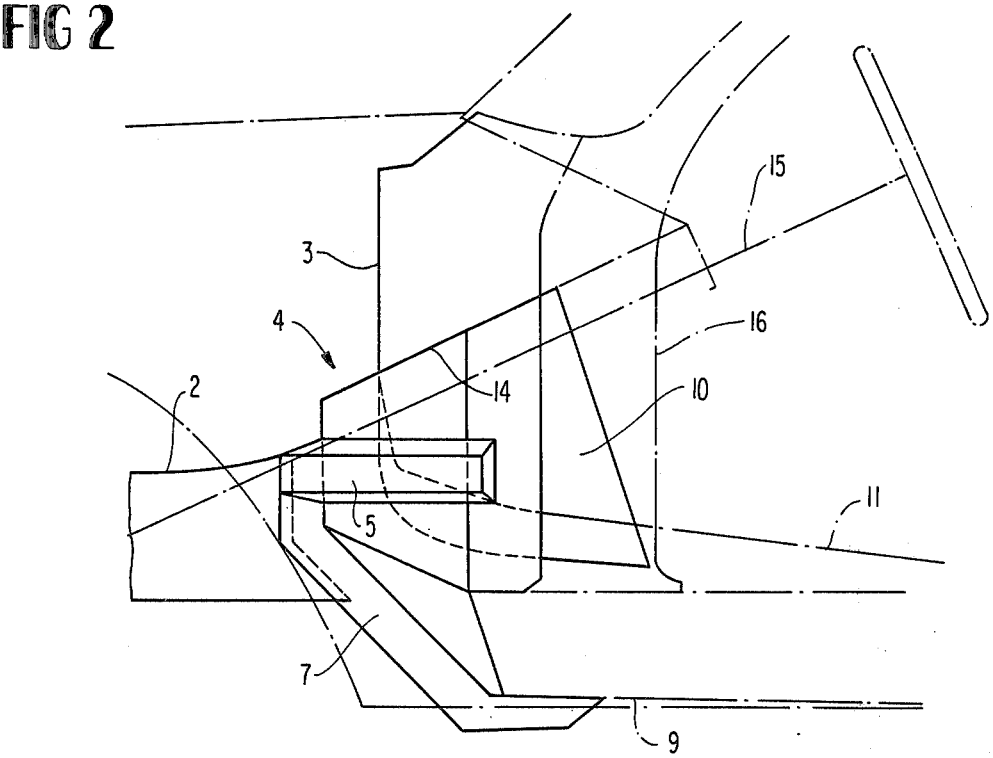
FIG. 2 is a somewhat schematic partial side elevational view of the connecting area of FIG. 1.
Figure 3:
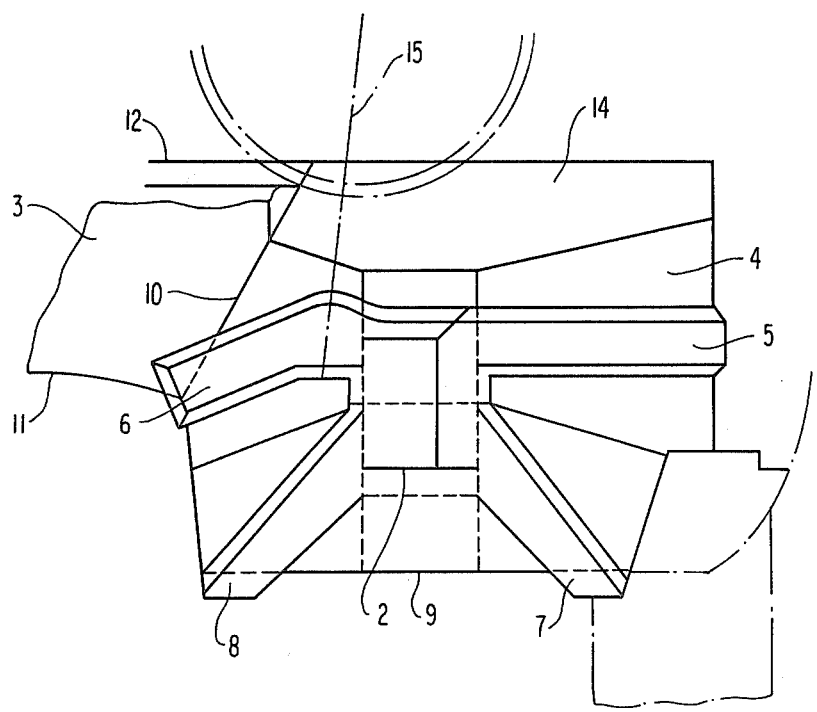
FIG. 3 is a somewhat schematic front elevational view of the connecting area illustrated in FIGS. 1 and 2.

As can be seen in particular from FIG. 2, the upper surface 14 of the form-rigid body 4 extends approximately parallel to the indicated steering spindle 15 whose steering column (not shown) can then be fixed in a simple manner. The two upper surfaces 14 may also be connected with each other in one piece whereby the connecting part takes over the function of the strut 12.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A motor vehicle body including a longitudinal bearer and comprising end wall means defining a wall of a passenger compartment and locally bulged out in the direction of the respective vehicle end in a manner forming a rigid body, said longitudinal bearer having an end supported against said end wall and being forked so as to create four arms partially surrounding said rigid body, a lower two of said arms leading to a subfloor forming means and an upper two of said arms terminating within the area of said rigid body.

2. A motor vehicle body according to claim 1, wherein one said longitudinal bearer and rigid body are formed on each side of a center vehicle longitudinal axis.

3. A motor vehicle body according to claim 1, characterized in that the two lower arms subtend an acute angle.

4. A motor vehicle body according to claim 1, characterized in that the arms form partial surfaces of a cap means mounted on the rigid body, the forward longitudinal bearer means abutting at least said cap means.

5. A motor vehicle body according to claim 1 or 4, characterized in that the cap means is mounted on the rigid body according to a sandwich-type of construction.

6. A motor vehicle body according to claim 1 or 4, characterized in that one said longitudinal bearer and rigid body are formed on opposite side of transmission tunnel, and in that each rigid body extends laterally to a forward wall column means and is connected with said transmission tunnel by way of a support surface means formed thereon, said support surface means on said opposite sides being connected with each other.

7. A motor vehicle body according to claim 6, characterized in that the upper surface of the rigid body extends approximately parallel to a steering spindle, and in that the fastening of a steering column takes place at the inner side of the upper surface.

8. A motor vehicle body according to claim 7, characterized in that the arms, in conjunction with the walls of the rigid body, have a closed bearer profile within the area of the rigid body means.

9. A motor vehicle body according to claim 7, characterized in that the two lower arms subtend an acute angle.

10. A motor vehicle body according to claim 1 or 3, characterized in that the upper surface of the rigid body extends approximately parallel to a steering spindle, and in that the fastening of a steering column takes place at the inner side of the upper surface.

11. A motor vehicle body according to claim 1, characterized in that the arms have a closed bearer profile within the area of the rigid body formed in conjunction with the walls thereof.

12. A motor vehicle body according to claim 8, characterized in that the two lower arms subtend an acute angle.

* * * * *